Dec. 6, 1955    R. V. McGRATH    2,725,620
METHOD OF FORMING A PRESSURE CONTAINER
Filed Feb. 2, 1950    2 Sheets-Sheet 1

Inventor:
Raymund V. McGrath,
By Schroeder, Merriam,
Hofgren & Brady, Attys.

Dec. 6, 1955 — R. V. McGRATH — 2,725,620
METHOD OF FORMING A PRESSURE CONTAINER
Filed Feb. 2, 1950 — 2 Sheets-Sheet 2
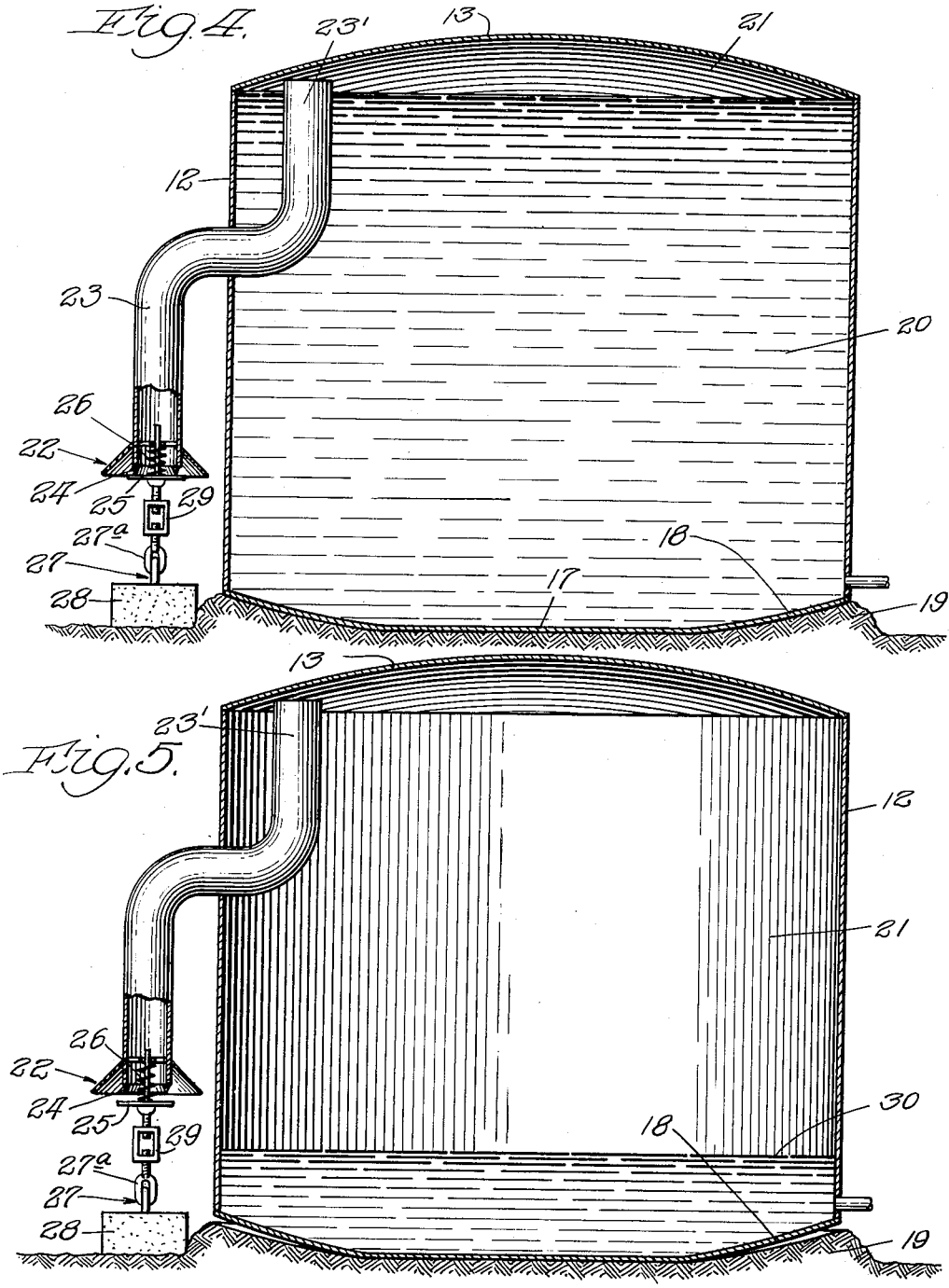

United States Patent Office 2,725,620
Patented Dec. 6, 1955

2,725,620
METHOD OF FORMING A PRESSURE CONTAINER

Raymund V. McGrath, Merrionette Park, Ill., assignor to Chicago Bridge & Iron Company, a corporation of Illinois Application February 2, 1950, Serial No. 142,019

6 Claims. (Cl. 29—421)

This invention relates to an improved method for making a pressure container.

A main factor in designing a pressure vessel for containing both a liquid and gases are the stresses caused by internal gas pressure which tends to lift the shell and peripheral edges of the bottom of the vessel off its grade when the gas pressure exceeds the weight of the top and shell of the tank.

The present invention provides a method for constructing an improved pressure vessel having a sufficient portion of the bottom curved to withstand all operating combinations of liquid and gas pressures and in which, means are provided to vent the gas pressure when it lifts a predetermined portion of the bottom from its grade.

An embodiment of this invention is illustrated in the accompanying drawings, in which:

Fig. 4 is a vertical section through the pressure vessel of this invention showing a pressure relief valve associated therewith; and Fig. 5 is a view similar to Fig. 4 showing the vessel shell raised above grade and the valve in open position.

Figure 1:
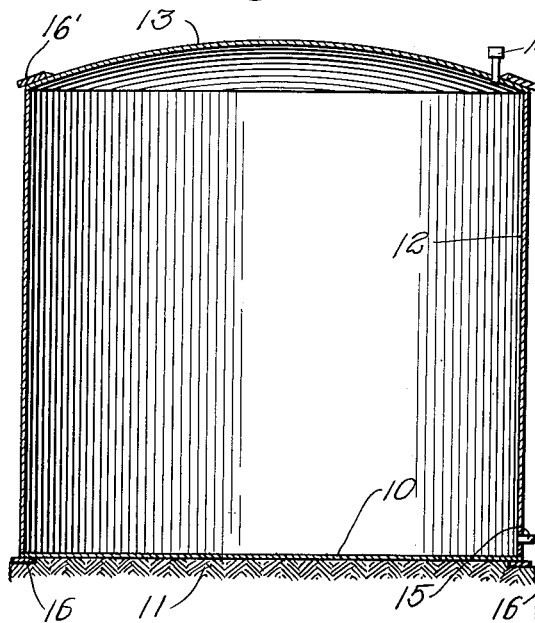
Fig. 1 is a vertical section view of a pressure vessel constructed on a flat grade.

A pressure vessel designed to withstand combined pressures of liquid and gas may have different configurations of both top and bottom. A flat-bottomed pressure vessel has an advantage of construction since flat plates which go to make up the bottom of the vessel are much easier to fabricate and weld, or otherwise fasten together, than a similar bottom of curved design. However, a curved or partly curved bottom is more able to withstand the stresses to which it is subjected when in use, than is a flat bottom. This invention provides a method of construction of such a pressure vessel, in which the advantages of plate layout and construction in a flat-bottom vessel and those advantages of a curved or partly curved bottom vessel, are achieved. As illustrated in Fig. 1 the bottom 10 of a pressure vessel may be constructed on a flat grade 11. After all the plates of the bottom 10 have been welded together the cylindrical side wall 12 and dome-shaped top 13 are attached to the bottom. The complete vessel may be formed while the bottom 10 rests on the flat grade 11. Suitable nozzles such as 14 and 15 may be provided communicating with the interior of the tank as desired. To avoid a collapsing of the shell at the point of juncture of a bottom and side walls, a compression girder or ring 16 normally is attached to the bottom at the juncture of the bottom and side wall. Usually there is a similar ring 16' at the juncture of the top and side wall.

After the vessel has been constructed as above described internal gas pressure is applied to the vessel until the bottom is raised off the flat grade 11 leaving only a flat substantially circular portion 17 in the center of the bottom and an annular inwardly concaved and upwardly curved bottom portion 18 between the flat center portion 17 and the side walls 12. While the internal gas pressure is held within the tank to hold the bottom annular portion in its upwardly curved position, the compression girder 16 prevents any collapsing of the side walls at their juncture with the bottom.

The internal gas pressure applied to the vessel is preferably equal to the intended service pressure, so that the bottom is raised from the flat grade 11 to a height at which normal working pressures would raise the bottom if the tank were left on a flat grade without liquid therein. While holding the bottom of the tank in its upwardly curved position, a foundation 19, which may be sand or other granular material, may be forced in under the upwardly curved portion of the bottom to form a permanent foundation for the tank. An advantage of this construction is to relieve the stresses which ordinarily would be set up in the bottom of the vessel by pre-stressing the bottom plates to the normal intended working gas pressure of the vessel. The curve of the bottom annular portion lies along the equilibrium curve for the designed uplift of the vessel shell. The bottom plates are thus given an internal stress tending to bring the plates to substantial flatness under conditions of no load. After the bottom is raised by internal gas pressure, the bottom plates will be prestressed to the designed working gas pressure of the vessel.

Figure 2:
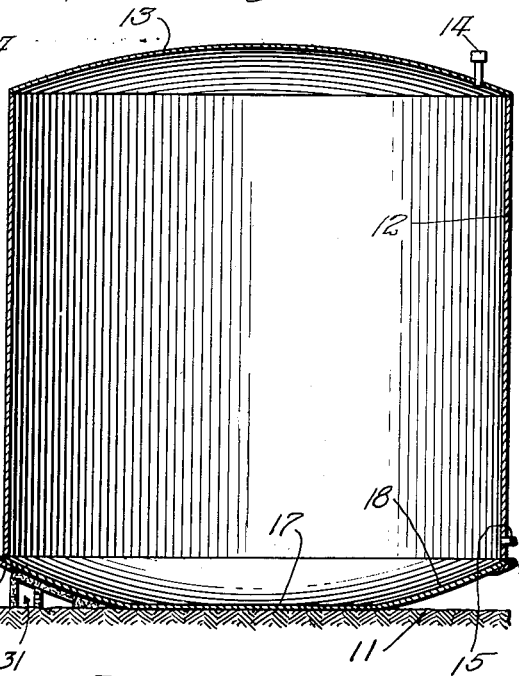
Fig. 2 is a view similar to Fig. 1, showing the bottom peripheral portions curved under influence of internal gas pressure.
Figure 3:
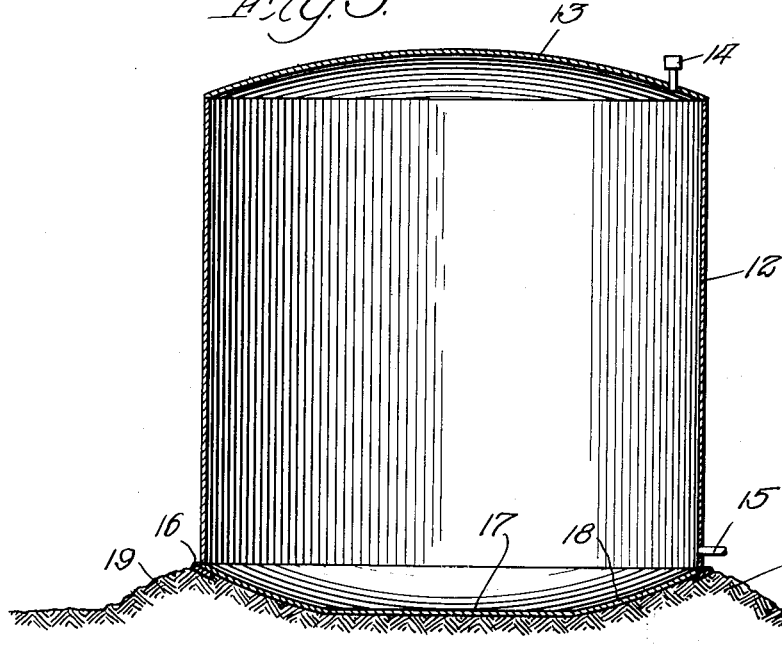
Fig. 3 is a view similar to Fig. 2 showing a granular foundation placed under the uplifted portion of the bottom.

If desired a pressure vessel may be constructed to give substantially the same results of a partially flat and partially curved bottom vessel by laying the outer edge of the bottom plates upon wedges 31 (Fig. 2) to give the final calculated slope and elevation of the bottom of the vessel at their juncture with the side walls. The weight of the bottom plates when placed upon wedges in this manner will cause the plates to sag in the middle, although the plates before being welded together to form the bottom were flat. After the bottom is formed and welded, the cylindrical side walls and dome-shaped top may be attached thereto and internal gas pressure applied to the vessel to hold the bottom in the shape as illustrated in Fig. 2. The temporary wedges are then removed and a granular foundation 19 may be placed under the raised portion of the bottom of the vessel. This procedure results in lower bending stresses than would otherwise exist at the bottom-to-shell junction.

Another alternative form of construction is to form a granular foundation to the calculated slope of the bottom of the vessel and then erect the bottom plates on this grade after which the cylindrical side walls and dome-shaped top are attached thereto. In the preferred and alternative constructions of the vessel the advantages of having a center substantially circular flat portion of the bottom are maintained. In each of these preferred constructions no holes in the grade need be formed as for other curved bottomed vessels and in each, the bottom plates are laid flat and welded on the grade. Gas pressure is utilized to form the bottom plates to their ultimate configuration to withstand the intended operating pressures of liquid and gas.

In each of the constructions the design of the plates comprising the completed vessel is determined by making the weight of the vessel side walls, top and upwardly curved portion of the bottom equal to the internal gas pressure acting against the center circular flat portion of the bottom, so that normally, there will be no uplift of the vessel shell off the final calculated grade of the foundation. The pressure vessel of this invention is designed to withstand all intended operating pressures of both liquid and gas so long as the vessel side walls are not allowed to lift beyond a given amount above the calculated and final grade. As illustrated in Fig. 4 the vessel containing a relatively great amount of liquid 20 and having a small vapor space 21 above the liquid would remain upon its foundation because the weight of the liquid would greatly exceed the uplift of the gas pressure in the vapor space 21.

A pressure relief valve 22 is provided with a gas passage 23 opening to the interior of the vessel at 23' above the highest liquid level in the vessel. The gas passage 23 passes through the side wall 12 of the vessel and is rigidly held therein whereby any movement of the side wall 12 also carries with it the gas passage 23. A valve seat 24 is fixed in the outer end of the gas passage 23 and is normally closed by a valve pallet 25 held in contact therewith by a tension spring 26. A linkage 27 is connected at one end to a suitable weight 28 on the ground outside of the tank and has a flexible portion 27a which permits the valve pallet 25 to lower itself toward the ground but does not permit the pallet 25 to raise upwardly beyond its closed position against the valve seat 24 when the curved portion 18 of the bottom is resting against the foundation. A turnbuckle 29 is provided in the linkage 27 for adjustment of the positioning of the valve pallet 25 above the ground level. When the liquid level is high in the pressure vessel as illustrated in Fig. 4 an excess of gas pressure acting against the tension of the spring 26 on the valve pallet 25 may cause the pallet to lower and vent the excess gas pressure to the atmosphere. In this manner the valve 22 acts as an ordinary pressure relief valve.

Fig. 5 illustrates the pressure vessel having a low liquid level 30 and a relatively great vapor space 21. Under these circumstances the gas pressure in the vessel may have an uplift which exceeds the weight of the top and shell and sufficient liquid in the vessel so that the walls 12 and top 13 of the vessel are lifted upwardly, raising the curved portions 18 of the bottom off the foundation. The uplift of the shell 12 raises the gas passages 23 which raises the valve seat 24 above the valve pallet 25. In this position the excess gas pressure is vented to the atmosphere until the weight of the liquid above the raised portion of the vessel plus the weight of the walls, top and curved bottom portion equals the uplift of the gas pressure therein, so that the vessel bottom again returns to rest upon the foundation. It will be noted that the valve 22 is thus constructed to vent gas pressure from the vessel either upon uplift of the side walls of the vessel or upon an excess of gas pressure over a predetermined tension of the spring 26 in the valve.

When the gas pressure within the vessel herein described raises the curved bottom portion off the foundation, the center substantially circular portion of the bottom remains on grade. If desired, a pressure relief valve may be placed in the top 13 of the vessel and a tie, such as a chain or the like, extended between the valve and the center flat portion of the bottom. Any uplift of the shell of the vesel would thus open the valve placed on the top of the vessel because the center flat portion of the bottom does not move off its grade. Also a pilot operated relief valve may be modified to vent the gas pressure within the vessel to the atmosphere upon an upward movement of the vessel shell. This may be done by connecting a flexible tie between the flat portion of the bottom and the valve stem of the pilot operating the pressure relief valve, only having the flexible tie affect pilot pressure which operates the main valve.

The foregoing detailed description has been given for clearness of understanding only, and no unnecessary limitations should be understood therefrom, but the invention should be construed broadly within the spirit and scope of the appended claims.

I claim:

1. The method for constructing a cylindrical pressure vessel which comprises, forming a flat circular bottom of relatively thin flexible plates for the vessel, attaching the side walls and top thereto, applying internal gas pressure to the vessel in amount generally equal to the intended service pressure to raise the outer portion of the bottom by bending of the bottom plates within their elastic limit, and then forming a foundation under the raised bottom portion to support said portion in substantially the raised position, and then releasing the internal pressure whereby the foundation maintains the vessel bottom in substantially its curved form.

2. The method for constructing a pressure vessel which comprises, forming a flat bottom of flexible metal plates, attaching side walls and a top thereto, applying internal gas pressure to the vessel at substantially the intended service pressure to raise the outer portion of the bottom, applying said pressure in amount to bend the bottom plates to the equilibrium curve at the intended service pressure and within the elastic limit of the metal, forming a foundation under the raised bottom portion while maintaining said internal gas pressure, and then releasing said gas pressure to permit the bottom plates to rest upon the foundation and be held thereby substantially in said curved position.

3. The method for constructing a pressure vessel which comprises, forming a support for the vessel, said support having a center circular flat area and a surrounding outer upwardly curved area, placing flexible vessel bottom plates on the support whereby their own weight at least partially bends the plates to the contour of the support, welding the plates together on the support to form the vessel bottom, then assembling the side walls and top of the vessel on the bottom to form a closed vessel, and then applying internal gas pressure at the intended service pressure to the vessel to form the bottom plates to the curvature of the support by bending the plates within their elastic limit.

4. The method as claimed in claim 3 including the steps of applying gas pressure to the interior of the closed vessel, removing the supports while maintaining the outer portion of the bottom in upwardly curved position by said gas pressure, then forming a foundation under said outer portion for supporting said portion in curved position, and releasing the gas pressure whereby the foundation prevents the bottom from returning to substantial flatness.

5. The method as claimed in claim 3 including the steps of forming said support on the ground with temporary supports for the outer upwardly curved area, applying internal gas pressure to the closed vessel, removing the temporary supports while maintaining said gas pressure in the vessel, then forming a foundation under said outer portion for supporting and maintaining said portion in curved position and then releasing the gas pressure.

6. The method of constructing a pressure vessel which comprises placing flexible bottom plates on substantially flat grade, said plates being welded together, assemblying the side walls and top of the vessel in sealing relationship to the bottom formed of said plates to form a closed vessel, applying a sufficient internal gas pressure to bend the bottom plates to substantially the configuration which would be produced by normal internal vapor pressure in the vessel when utilized for storage, and forming a foundation beneath the raised portion of the bottom, said bottom being provided thereby with a substantially flat central circular area.

References Cited in the file of this patent

UNITED STATES PATENTS

| | | |
|---|---|---|
| 1,747,840 | Patterson | Feb. 18, 1930 |
| 1,778,944 | Horton | Oct. 21, 1930 |
| 1,885,601 | Norton | Nov. 1, 1932 |
| 1,930,494 | Wiggins | Oct. 17, 1933 |
| 2,050,685 | Wiggins | Aug. 11, 1936 |
| 2,073,684 | Coakley | Mar. 16, 1937 |
| 2,105,080 | Jagschitz | Jan. 11, 1938 |
| 2,123,381 | Reichel | July 12, 1938 |
| 2,304,354 | Harvey | Dec. 8, 1942 |
| 2,355,874 | Laird | Aug. 15, 1944 |
| 2,363,992 | Reiser | Nov. 28, 1944 |
| 2,503,190 | Branson | Apr. 4, 1950 |
| 2,503,191 | Branson | Apr. 4, 1950 |
| 2,531,897 | Ulm | Nov. 28, 1950 |